(12) United States Patent
Nolting

(10) Patent No.: US 7,027,574 B2
(45) Date of Patent: *Apr. 11, 2006

(54) NETWORK PLANNING TRAFFIC MEASUREMENT PROGRAM

(75) Inventor: Thomas Paul Nolting, Holliston, MA (US)

(73) Assignee: Verizon Services Corp., Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/783,117

(22) Filed: Feb. 15, 2001

(65) Prior Publication Data

US 2001/0028706 A1    Oct. 11, 2001

Related U.S. Application Data

(63) Continuation of application No. 09/048,102, filed on Mar. 26, 1998, now Pat. No. 6,282,267.

(51) Int. Cl.
*H04M 15/00* (2006.01)

(52) U.S. Cl. .................. 379/134; 379/112.01; 379/133

(58) Field of Classification Search ............. 379/32.01, 379/32.03, 32.05, 111, 112.01, 133–134, 379/120, 127.01, 229, 230, 126, 219
See application file for complete search history.

(56) References Cited

U.S. PATENT DOCUMENTS

| | | | |
|---|---|---|---|
| 4,456,788 A | 6/1984 | Kline et al. | |
| 4,464,543 A | 8/1984 | Kline et al. | |
| 4,760,594 A | 7/1988 | Reed | |
| 5,285,494 A | 2/1994 | Sprecher et al. | |
| 5,333,183 A | 7/1994 | Herbert | |
| 5,359,649 A | 10/1994 | Rosu et al. | |
| 5,425,087 A | 6/1995 | Gerber et al. | |
| 5,434,845 A | 7/1995 | Miller | |
| 5,438,570 A | 8/1995 | Karras et al. | |
| 5,457,729 A | 10/1995 | Hamann et al. | |
| 5,475,732 A | 12/1995 | Pester, III | |

(Continued)

OTHER PUBLICATIONS

"Gentia Software," Data Warehousing Tools Bulletin, Sec. 3: Query and Reporting Tools, META Group (Aug. 1997), pp. 3615-3620.

*Primary Examiner*—Duc Nguyen
(74) *Attorney, Agent, or Firm*—Leonard C. Suchyta, Esq.; Joseph R. Palmieri, Esq.; Rader, Fishman & Grauer PLLC

(57) ABSTRACT

In a public switched telephone network, real time monitors on SS7 links will collect interoffice signaling messages. A site processor compiles data from the signaling messages relating to individual calls, to form call detail records (CDRs) for all interoffice call attempts. The site servers upload the CDRs to a central server. Automatic Message Accounting (AMA) records also are accumulated for at least selected central office switching systems and uploaded to a server. Programs running on the servers enable network operations personal to analyze a variety of network traffic patterns, for example to study the number of calls to particular numbers during various times periods and the hold time of the calls in order to identify the numbers of Internet Service Providers (ISPs). As another example, the traffic analysis may indicate the amount of traffic between two end offices and the percentage thereof routed through a tandem office, to allow network planners to design trunk upgrades between the various offices and/or to plan the addition of new offices.

54 Claims, 7 Drawing Sheets

U.S. PATENT DOCUMENTS

| | | |
|---|---|---|
| 5,563,930 A | 10/1996 | Pester, III |
| 5,579,371 A | 11/1996 | Aridas et al. |
| 5,592,530 A * | 1/1997 | Brockman et al. |
| 5,642,396 A | 6/1997 | Cowgill |
| 5,692,181 A | 11/1997 | Anand et al. |
| 5,712,908 A | 1/1998 | Brinkman et al. |
| 5,715,294 A | 2/1998 | Pester, III |
| 5,737,399 A | 4/1998 | Witzman et al. |
| 5,757,895 A | 5/1998 | Aridas et al. |
| 5,768,352 A | 6/1998 | Elliott et al. |
| 5,774,530 A | 6/1998 | Montgomery et al. |
| 5,793,839 A | 8/1998 | Farris et al. |
| 5,802,145 A | 9/1998 | Farris et al. |
| 5,809,120 A | 9/1998 | Montgomery et al. |
| 5,825,769 A | 10/1998 | O'Reilly et al. |
| 5,828,729 A | 10/1998 | Clermont et al. |
| 5,835,583 A | 11/1998 | Hetz et al. |
| 5,838,682 A | 11/1998 | Dekelbaum et al. |
| 5,838,796 A | 11/1998 | Mittenthal |
| 5,844,981 A | 12/1998 | Pitchford et al. |
| 5,850,426 A | 12/1998 | Watkins et al. |
| 5,852,819 A | 12/1998 | Beller |
| 5,854,834 A | 12/1998 | Gottlieb et al. |
| 5,854,835 A | 12/1998 | Montgomery et al. |
| 5,864,608 A | 1/1999 | Brownmiller et al. |
| 5,867,558 A | 2/1999 | Swanson |
| 5,867,565 A | 2/1999 | Morikawa |
| 5,881,140 A | 3/1999 | Gerault et al. |
| 5,896,445 A | 4/1999 | Kay et al. |
| 5,901,208 A | 5/1999 | Jabbarnezhad |
| 5,905,785 A | 5/1999 | Dunn et al. |
| 5,905,985 A * | 5/1999 | Malloy et al. |
| 5,907,603 A | 5/1999 | Gallagher et al. |
| 5,917,898 A | 6/1999 | Bassa et al. |
| 5,933,490 A | 8/1999 | White et al. |
| 5,937,042 A | 8/1999 | Sofman |
| 5,940,471 A | 8/1999 | Homayoun |
| 5,949,862 A | 9/1999 | Fukuzawa et al. |
| 5,999,604 A | 12/1999 | Walter |
| 6,011,838 A | 1/2000 | Cox |
| 6,052,447 A | 4/2000 | Golden et al. |
| 6,052,448 A | 4/2000 | Janning |
| 6,067,354 A | 5/2000 | Bauer et al. |
| 6,078,647 A | 6/2000 | D'Eletto |

* cited by examiner

CALLED PARTY NUMBER DECODE

| | LENGTH | OCTET | ID |
|---|---|---|---|
| NATURE CONNECTION | 1 | 16 | |
| FORWARD CALL INDICATORS | 2 | 17 & 18 | |
| CALLING PARTY'S CAT | 1 | 19 | |
| POINTER TO USER SERVICE INFORMATION | 1 | 20 | A |
| LENGTH OF USER SERVICE INFORMATION | 1 | 20 + A OR A | C |
| USER SERVICE INFO | C | 20 + A + I TO 20 + A + I + C | |
| POINTER TO CALLED PARTY NUMBER | 1 | 21 | D |
| LENGTH INDICATOR FOR CALLED PARTY NUMBER | 1 | 21 + D OR D | E |
| CALLED PARTY NUM | D | 21 + D + I TO 21 + D + I + E | |
| POINTER TO START OF OPTIONAL PART | 1 | 22 | |

FIG. 5

HEX CONVERSION

| BIN  | H | D  |
|------|---|----|
| 0000 | 0 | 0  |
| 0001 | 1 | 1  |
| 0010 | 2 | 2  |
| 0011 | 3 | 3  |
| 0100 | 4 | 4  |
| 0101 | 5 | 5  |
| 0110 | 6 | 6  |
| 0111 | 7 | 7  |
| 1000 | 8 | 8  |
| 1001 | 9 | 9  |
| 1010 | A | 10 |
| 1011 | B | 11 |
| 1100 | C | 12 |
| 1101 | D | 13 |
| 1110 | E | 14 |
| 1111 | F | 15 |

BIN POSITION VALUE

| msb | | | | | | | | | | | lsb |
|-----|------|-----|-----|-----|----|----|----|---|---|---|---|
| 2048 | 1024 | 512 | 256 | 128 | 64 | 32 | 16 | 8 | 4 | 2 | 1 |

HEX POSITION VALUE

| msb | | | lsb |
|------|-----|----|---|
| 4096 | 256 | 16 | 1 |

FIG. 6

NETWORK PLANNING TRAFFIC MEASUREMENT PROGRAM

This application is a Continuation of application Ser. No. 09/048,102 filed Mar. 26, 1998, now U.S. Pat. No. 6,282,267.

TECHNICAL FIELD

The present invention relates to a method and system for analyzing a variety of network traffic patterns to permit network planners to design trunk upgrades between various offices and/or to plan the addition of new offices.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Advanced Intelligent Network (AIN)
Asynchronous Digital Signal Line (ADSL)
ANswer Message (ANM)
Automatic Message Accounting (AMA)
Automatic Number Identification (ANI)
Call Processing Record (CPR)
Call Detail Record (CDR)
Central Office (CO)
Certified Local Exchange Carrier (CLEC)
Common Channel Interoffice Signaling (CCIS)
Comma Separated Values (CSV)
Data and Reporting System (DRS)
Engineering Data Acquisition System (EDAS)
Executive Information System (EIS)
Destination Point Code (DPC)
Fiber Distributed Data Interface (FDDI)
Generic Data Interface (GDI)
Initial Address Message (IAM)
Integrated Service Control Point (ISCP)
Integrated Services Digital Network (ISDN)
ISDN User Part (ISDN-UP)
Intelligent Peripheral (IP)
Internet Service Provider (ISP)
Line Identification Data Base (LIDB)
Message Processing Server (MPS)
Multi-Services Application Platform (MSAP)
Office Equipment (OE)
Online Analytical Processing (OLAP)
Origination Point Code (OPC)
Personal Area Network (PAN)
Personal Communications Service (PCS)
Plain Old Telephone Service (POTS)
Point in Call (PIC)
Personal Identification Number (PIN)
Primary Rate Interface (PRI)
Public Switched Telephone Network (PSTN)
Release Complete Message (RLC)
Release Message (REL)
Revenue Accounting Office (RAO)
Service Control Point (SOP)
Service Creation Environment (SCE)
Service Management System (SMS)
Service Switching Point (SSP)
Signaling System 7 (SS7)
Signaling Point (SP)
Signaling Transfer Point (STP)
Simplified Message Desk Interface (SMDI)
Speaker Identification/Verification (SIV)
Terminating Attempt Trigger (TAT)
Time Slot Interchange (TSI)
Traffic Service Position System (TSPS)
Transaction Capabilities Applications Part (TCAP)
Transmission Control Protocol/Internet Protocol (TCP/IP)
Wide Area Network (WAN)

BACKGROUND ART

An essential problem in optimizing a telecommunications network is balancing equipment and trunking against service and cost. Network design involves predicting future demand based on past results, evaluating the capacity of equipment and facilities, and providing the correct amount of capacity in the proper configuration, in time to meet service objectives. Since virtually every element of a telecommunications system is subject to failure or overload effective testing, monitoring, control, and maintenance is essential to obtain an acceptable level of performance.

U.S. Pat. No. 5,475,732 issued to Eugene Pester Dec. 12, 1995, for Common Channeling Signaling Network Maintenance and Testing, describes an SS7 Network Preventative Maintenance System for detecting potential SS7 and switched network troubles, automatically analyzing the troubles, and providing alarm and corrective action to avoid major network events. The Pester SS7 Real Time Monitor System described in that patent is a multi stage SS7 network preventative maintenance tool that detects potential SS7 and switched network troubles, automatically analyzes those troubles, and provides alarm and corrective action instructions to maintenance personnel in time to avoid a major network event. This is accomplished by placing real time SS7 monitors on links at the Signal Transfer Points (STPs).

Information on exceeded Link Load, exceeded Message Signaling Unit (MSU) frequency and Network Management status/error conditions is passed to a Stage 1 controller or process. The Stage 1 process controls link monitors capable of monitoring upwards of 32 link monitors at a single STP. The monitors perform preliminary link analysis on error conditions. If the monitors identify trouble on any of the links, alarm information is sent to a Stage 2 controller or process via the Stage 1 process. The Stage 2 process controls all Stage 1 and associated monitors from an STP pair. If Stage 2 determines that there is an STP pair network trouble, it generates alarm and corrective action information and passes it to the Stage 3 controller or process. The Stage 3 process controls all Stage 2 controllers or processes in the operating company. If Stage 3 determines that there is potential or real company network trouble, it generates alarm and corrective action information and display signals on maintenance terminals in the company's SS7 control center (SEAC, SCC, etc.). Stage 3 also alerts the Stage 4 controller process.

U.S. Pat. No. 5,592,530 issued to Brockman et al (Brockman) on Jan. 7, 1997 for Telephone Switch Dual Monitors, relates to testing and monitoring systems for evaluating the operations of telephone switches and more particularly to monitoring systems which are arranged to capture data between nodes of a telephone switching system where the data flows between mated nodes, as in an SS7 common channel signaling network. The Brockman Patent uses the term "telephone switches" to refer to service transfer points (STPs) in the SS7 network.

The patent indicates that an SS7 network can be thought of as a separate switching system which is used prior to, during, and at the end of calls for the purpose of routing control information. Whenever two switches or elements in the SS7 network have to pass call control information to one another during or prior to a phone call, they pass this data via the SS7 network. The patent describes an SS7 network as traditionally having three basic types of network node elements. These are listed as the Service Switching Point (SSP), which may be a central office, tandem or end office switch, a Service Control Point (SCP), and a Signal Transfer Point (STP), which is described as essentially a packet switch which routes the messages from SSPs and SCPs to SSPs and SCPs.

The SS7 network is stated to be critical to operation of the telephone network and to require the deployment of "surveillance equipment to monitor the links connecting the nodes of the SS7 network." The patent describes the topology of the SS7 network as such that STPs are deployed in a mated pair configuration at geographically separate locations. A set of SSPs and SCPs will be connected to a mated pair of STPs. This conglomeration of SSPs, SCPs, and mated pair STPs is called a cluster. Clusters are then connected by D-QUAD links between STP mated pairs.

The patent indicates that it is often the case that the messages going from switch A to switch B travel one route on the network, while the messages going from switch B to switch A travel a different route. The network surveillance equipment that monitors the link is designed to capture and correlate as much signaling information as possible regarding network activity. Because of the different paths that messages may take, data relating to a subscribers phone number may be all in one STP, or split partially in one STP and partially in the other STP of the mated pair "which may be in a different city."

The patent postulates that what is needed is a "distributed state machine that can capture all of the SS7 messages within a mated pair cluster and correlate the fragmented SS7 messages pertaining to a particular call or transaction to a single data record." The patent further states that what is needed is a filtering of redundant or unnecessary SS7 messages in order to compile call transaction records containing a minimum amount of essential data in order to evaluate overall system performance and to diagnose system errors when they occur.

The patent indicates that "the ability to capture all of the SS7 messages within a mated pair cluster and correlate the fragmented SS7 messages makes other improvements to telephone network services possible. In addition to the performance monitoring applications outlined above, there is a need for systems which are capable of generating call detail records from the SS7 messages of a mated pair cluster for use in billing systems and to implement a fraud detection system for certain types of telephone calling cards." The patent goes on to indicate a need for telephone monitoring systems which enable a user to implement a call trace mechanism that can track all SS7 messages associated with a particular phone number in order to retroactively trace harassing or obscene phone calls.

Additionally, it is stated that there is a need for a telephone monitoring system which can monitor the SS7 messages of a mated pair cluster in order to implement what is called "mass call onset detection." This is stated to be useful in circumstances where a large number of callers attempt to call a single phone number at the same time, such as where radio stations give away prizes to callers who call in immediately, thereby creating a mass call-in. It is indicated that mass call onset detection applications detect the situation early as the number of SS7 messages pertaining to a particular phone number increases rapidly and alerts the phone company quickly to the large number of busy conditions associated with a given phone number.

In summarizing its description the patent states that the monitoring devices "key off the links to the SS7 itself, so that all data on the SS7 circuits entering the STPs are monitored." However, a level of filtering is provided to capture only the data which is necessary for providing call detail records. The STP is stated to be the central routing point for the SS7 data. Monitoring devices are connected by a communication link that enables the monitoring devices to track and correlate all the SS7 data at an application layer in a distributed fashion across two STPs. From this one can determine error conditions at the application layer of the network. It is also possible to generate information that could be used for fraud detection and could generate another level of call detail records.

While the above discussed Pester and Brockman et al patents describe the usefulness of monitors in an SS7 common channel interoffice signaling network for event detection, neither of these patents is directed to the particular problems addressed by the present invention. The Pester patent places emphasis on monitoring of the SS7 network itself in order to detect troubles in its functioning. SS7 link monitors are utilized on each SS7 link in the illustrated depiction of that system. The Brockman et al patent focuses on monitoring of all links to the STPs in a pair and the assembly of related SS7 signaling messages comprising a record of call completions.

While these methodologies may be effective for their stated purposes there remains a distinct need for an efficient and effective tool for coping with the types of traffic and billing problems which are presently associated with overload of trunk circuits to Internet Service Providers (ISPs) and to Competitor Local Exchange Carriers (CLECs). Attempts to use other more traditional approaches, such as the switches themselves and the Engineering Data Acquisition System (EDAS), fell short of providing the desired information.

It is accordingly an object of this invention to provide a relatively low cost solution to those problems. While two specific problem situations are mentioned as typical for ease of description of the invention, it is to be understood that those problems are to be regarded as examples only, as the invention is applicable to a wide variety of related problems.

It is another object of the invention to provide a timely, powerful, cost effective means of analyzing traffic on the Public Switched Telephone Network (PSTN).

It is a further object of the invention to provide a flexible, expedient, accurate, and cost effective method to identify individual high usage lines contributing to network blockage.

It is another object of the invention to provide a tandem trunk planning resource which will accommodate future tandem switch growth respondent to customer calling patterns, communities of interest and points of origin and destination.

It is yet another object of the invention to implement Internet Service Provider (ISP) studies and enable better service to ISP customers while maintaining optimal network utilization.

DISCLOSURE OF THE INVENTION

The present invention utilizes real time monitors on selected SS7 links to collect interoffice signaling messages. A site processor compiles data from the signaling messages relating to individual calls, to form call detail records (CDRs) for all interoffice call attempts. The site servers upload the CDRs to a central server. Automatic Message Accounting (AMA) records also are accumulated for at least selected central office switching systems and uploaded to a server. Programs running on the servers enable network operations personnel to analyze a variety of network traffic patterns. One example is to study the number of calls to particular numbers during various time periods and the hold time of the calls in order to identify the numbers of Internet Service Providers (ISPs). Another example would involve a situation where traffic analysis may indicate the amount of traffic between two end offices and the percentage thereof routed through a tandem office, to allow network planners to design trunk upgrades between the various offices and/or to plan the addition of new offices.

It is a feature of the invention that at least one of the servers running analytical programs constitutes an on line analytical processing means providing a multidimensional database, wherein relational files and AMA information relating to call set up and tear down are processed to consolidate and summarize successful and unsuccessful attempts to route calls and provide reports thereof.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

FIGS. 5 and 6 provide an illustrative breakdown of an IAM.

BEST MODE FOR CARRYING OUT THE INVENTION

Because the functioning of the invention is dependent upon the information which may be obtained from the operation of the SS7 common channel interoffice signaling network, a detailed description of the operation of that network is believed helpful. Those familiar with that operation may desire to proceed to the next section of the specification.

Figure 2:
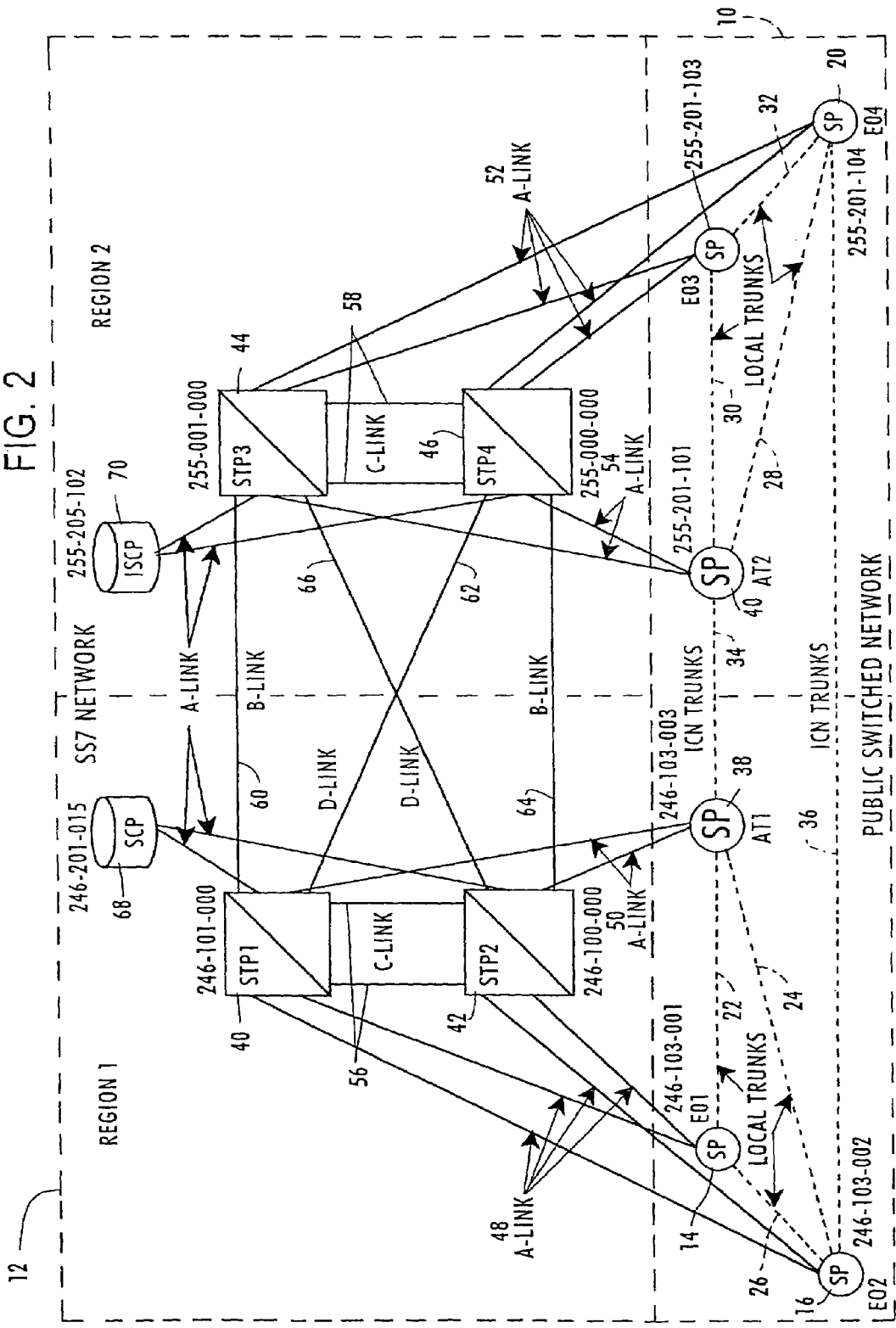
FIG. 2 is a block diagram of a Public Switched Telephone Network and its SS7 signal control network.

Referring to FIG. 2 there is shown a block diagram of a public switched telephone network and the SS7 network that is used to control the signaling for the switched network. Thus an analog switched telephone network is generally indicated at 10 having a common channel signaling network in the form of an SS7 network illustrated generally at 12. The switched telephone network consists of a series of central offices which are conventionally referred to as signaling points (SPs) in reference to the SS7 network. Certain of these SPs comprise end offices (EOs) illustrated at 14, 16, 18 and 20 as EOs 1–4 in FIG. 2. Each signaling point has a point code comprising a 9-digit code assigned to every node in the network. In FIG. 2 EO1 has a point code of 246-103-001, EO2 has a point code of 246-103-002, EO3 has a point code of 255-201-103, and EO4 has a point code of 255-201-104.

The end offices EO1 and EO2 represent end offices in the region of one regional operating company while end offices EO3 and EO4 represent end offices of the region of a different operating company. Each operating company has its own network ID, shown here as 246 for the left region and 255 for the right region in FIG. 2. The number 103 in the designation 246-103-001, is the number of the cluster. A cluster can hold 32 SPs or members, the member being designated by the final 3 numbers. Thus 246 may represent C & P of Virginia Regional Operating Company, cluster 103, member EO2 for EO2 when viewed from an SS7 standpoint.

The broken lines connecting the SPs together may be analog trunks or voice or similar circuits. The SPs in a given region are connected together by local trunks 22, 24 and 26 in the left region and 28, 30 and 32 in the right region. The SPs in one region are connected to the SPs in other regions via inter-exchange carrier network trunks or ICN trunks 34 and 36 in FIG. 2 connected to Access Tandems (ATs) 38 and 40 (AT1 and AT2). These SPs or ATs are shown as having point codes 246-103-003 and 255-201-101 respectively.

Referring to FIG. 2, the SS7 network 12 comprises a series of Signal Transfer Points (STPs) shown here at 40, 42, 44 and 46 designated STP1, STP2, STP3 and STP4. Each STP in a network is connected to the SPs in the network by A links indicated at 48, 50, 52 and 54. STP1 and STP2 constitute a mated pair of STPs connected by C links 56 while STP3 and STP4 constitute a mated pair connected by C links 58, each mated pair serving its respective transport area. It will be understood that there may be multiple mated pairs per region, one for each designated transport area. STP1 is connected to STP3 by B link 60 and to STP4 by D link 62. STP2 is connected to STP4 by B link 64 and to STP3 by D link 66.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as translations in STP4. The C links communicate between the paired STPs for network management information and SS7 message routing. The STP pair cannot function without the C links. Therefore, unnecessary utilization of the C links causes congestion and prevents the paired STPs from performing their intended function.

The STPs are connected to Signal Control Points (SCPs) indicated in FIG. 2 as an SCP 68 and an ISCP 70. The ISCP Is an Integrated Signaling Control Point, which is basically the same as an SCP but comprises a larger and more powerful computer. AIN may also be regarded as another ISCP. SCPs are usually used for 800 and credit card services with ISCPs being used for AIN. However, this is optional. The ISCP may hold application information as well as routing information whereas an SCP contains routing information, i.e., routing tables.

The SS7 network constitutes a highly redundant data network, generally a 56K switched data circuit. By way of example, an SS7 message from EO2 to EO4 might travel any one of 8 possible routes. It could go from EO2 to STP1, from STP1 to STP3, STP3 to EO4. One variation on that route would be from STP1 down the D link 62 to STP4 to EO4, and so forth. In the event that a link between STP3 and EO4 was lost, an SS7 route could be established from EO2 to EO4 via STP1 to STP3 and then via C link 58 to STP4 to EO4. However, that would be an undesirable route in unnecessarily using the C link. A links provide direct connectivity while C links provide circuitous routes using extra switches, a situation to be avoided. An alternate route would be from STP1 via D link 62 to STP4 to EO4. Another reason for not using the C link is to avoid tying up the entire STP3–STP4 pair.

The operation of placing a call from EO2 to EO4 may be described as follows: The user at EO2 picks up his phone and dials the number that resides in EO4. The SP generates an Initial Address Message (IAM). This message would have the destination point code of EO4, namely, point code 255-201-104. it would have an originating point code of EO2, namely, 246-103-002, in addition to miscellaneous other information needed for call set-up. That message would then be sent to either STP1 or STP2. Assuming that the message goes to STP1, STP1 would look at the message and determine that the message was not for it as an STP but rather is for EO4. STP1 would then investigate possible routings to get to 255 or EO4. B and D links are available and STP1 would choose one of the two. Assuming that it chooses the B link to STP3, STP3 repeats the same procedure. It determines that the message is for 255 or EO4 and puts that message on the A link to EO4.

EO4 gets the IAM which has the called telephone number in it and determines whether or not the line is busy. If the line is not busy, EO4 generates an Address Complete Message (ACM) to indicate that it received the request for a call and that the number is not busy. That message is sent back by simply reversing the point codes. Now the destination point code is EO2 and the originating point code is EO4. The message goes back to EO2 to indicate that the IAM was received and processed. As soon as the phone is answered at EO4, EO4 sends an Answer Message (ANS) back to EO2 indicating that the phone at EO4 was picked up, and at that time the trunks are connected together. EO2 connects its user to that trunk and EO4 connects its user to that trunk so that communication is established. All such messaging may occur in about 600 milliseconds which would be average but not necessarily fast.

The foregoing constitutes the function of the STPs insofar as routing is concerned. The STPs look at a point code and if it is not for them they just pass it on via a route determined from translations and routing tables. The C link is the last route permitted and is not utilized unless no other route is available.

As opposed to the foregoing, where the point code was for EO4 and not STP1, the point code may be for STP1. One example of such a situation would be the case of an 800 call. The 800 number is a fictitious number which is associated with a POTS number in a database in the SCP. Thus if EO2 makes an 800 call to EO4 it is necessary to determine the real telephone number. EO2 launches a Switching Connection Control Park (SCCP) message, which is a database request. This point code has a destination point code of an alias which is the point code of STP1 and STP2. STP1 and STP2 have various point codes indicated in FIG. 2 as 246-100-000 and 246-101-000. They also have alias point codes that indicate that they have a function to perform. Upon recognizing such a point code the STP does a data search and generates another SCP message to perform a database dip. This returns the real telephone number and the STP now has the destination point code of the real telephone number message. This is sent back to EO2. STP1 determines that this message is not for me but for EO2. The message is sent back down to EO2. EO2 now has a real telephone number and the system performs the IAM and ACM procedure all over again to set up the call. The only difference between a regular direct call and an 800 call is the necessity to perform the dip to obtain the real number first. This procedure takes about 1.3 seconds because of the additional operation. The STPs have various databases, such as the 800 database and the credit card database, and there is still a further database for AIN.

The SS7 protocol describes how the signal messages are built and routed and provides for network management of the SS7 network itself. Thus if a link between EO4 and STP3 were to be lost, STP3 generates a transfer restricted message (TFR) to all nodes, i.e., all SPs connected to STP3, indicating that traffic is not to be sent to STP3 for EO4 because no route from STP3 to EO4 exists. If both A links to EO4 were down, EO4 would essentially be isolated and the STP pair STP3 STP4 would broadcast a transfer prohibited (TFP) message indicating that nothing should be sent to the pair for EO4.

In the transfer restricted situation it would be possible for STP3 to reach 704 via the C link to STP4. This is a non-favored route but would be used in necessity. Handling such situations is the purpose of network managing messages. Congestion control or TFC accomplishes basically the same thing except that it constitutes a more sophisticated message limiting use of a circuit by stopping messages below a certain priority. Each message has a different priority. IAMs have a priority of 1 where ANS messages have a priority of 2.

Upon congestion occurring in the STP node for EO4 a new call could not be sent to EO4 because it constitutes a priority 1 message which is restricted because the congestion level is 2. Only priority 2 messages and higher would be permitted. If a call is already existing it could be answered or released. Releases have a priority of 2 to permit call completion. New calls could not be initiated until the congestion had been removed or lowered to congestion status 1 or 0.

The SS7 network constitutes a sophisticated network having a high predictability which is spelled out in the predetermined protocol. If all facts regarding the network are known it is possible to predict what will (or should) occur next. The system and method of the present invention is predicated upon recognition of that fact.

The SS7 messages traverse the network at all times. The messages themselves comprise digital serial messages that come into the STP. The start of the message is identified by a flag which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bits or in octets. These octets represent the information carried by the message. The message contains both fixed and variable parameters. The Message Transport Part (MTP) of the SS7 message is always in the same place. The values change but the MTP is always in the same place.

Figures 3, 4:
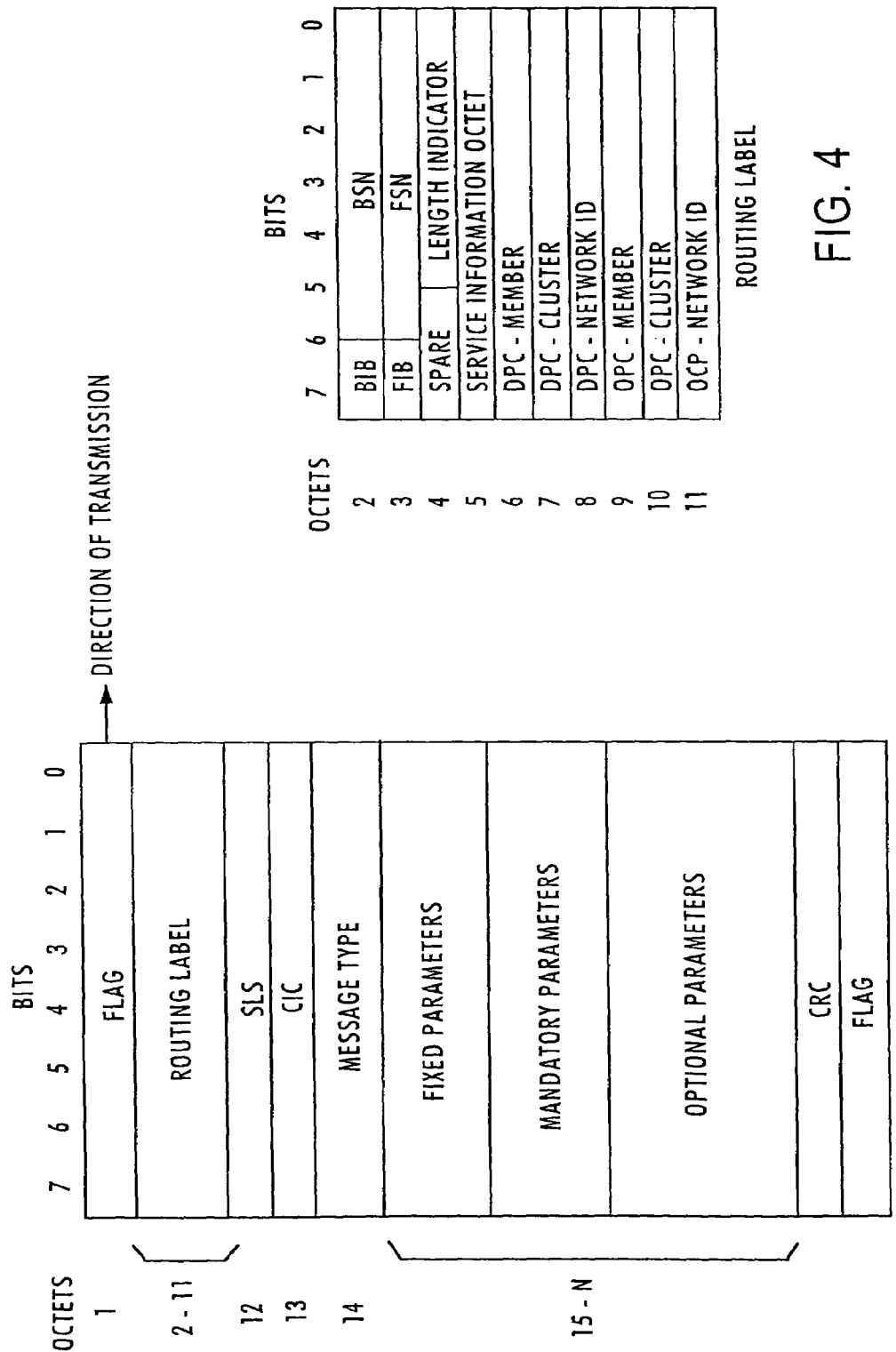
FIGS. 3 and 4 illustrate in graphic and tabular form respectively the protocol of an SS7 data signal.

Referring to FIGS. 3 and 4, the start of a message is indicated at 72 with the commencement of the flag 74. The first 7 bits following the flag constitute the Backward Sequence Number (BSN). The eighth bit is the backward indicator bit which is used to track whether messages have been received correctly. The backward sequence number was the forward sequence of the other node's message when it was sent. Referring to FIG. 2, if EO2 sends a message to EO4, EO2s include a Forward Sequence Number (FSN) in the 3rd octet of its message. Upon receiving this message, EO4 will include a Backward Sequence Number (BSN) equal to the FSN sent in the previous message in its next message to EO2. This indicated to EO2 that EO4 received the first message. This constitutes a positive acknowledgment of receipt of a message. If the eighth bit of the second octet or Backward Indicator Bit (BIB) is inverted, it indicates a failure to receive the identified message. If the 8th bit in the 2nd octet, Backward Indicator Bit (BIB), is inverted, it tells the receiving node that the identified message was not received. The accompanying BSN represents the last message that was received. The receiving node will then invert its Forward Indicating Bit (FIB), 8th bit of the 3rd octet, acknowledging a retransmission remission request, and will begin to send the missing messages until the transmitting end successfully acknowledges all remaining messages, i.e.:

EO2 sends a message with a FSN of 5 to EO4;

EO4 transmits a message back to EO2 with an inverted BIB and a BSN of 2, indicating that was the last message it received;

EO2 then inverts its FIB and retransmits message 3;

If EO4 acknowledges this message correctly (BSN of 3) EO2 will retransmit message 4 and then 5.

Thus between the BIB and FIB and BSN and FSN, the STP keeps track of all of the messages sent between the two nodes at each end of a link. This provides predictability. If a node fails to receive an acknowledgment within a predetermined period of time it will take the link out of service because it is receiving no acknowledgments. This is usually a short period of time such as 1.6 seconds.

Every 8 bits represents another part of the message until the end of the message. At about the fourth octet there is a length indicator to indicate the length of the message. In this case the message is bad in that it indicates six which is not a complete message. Assuming a complete message where the length indicator indicates 23 octets, this provides another means for error detection. Thus if the recipient counts to 28 this indicates that something is wrong and the message is sent again.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls or 800, LSSUs are used for alignment, and FISUs are fill in signals. Thus an LSSU is seen only if the link is out of service and going back into service or going out of service.

Octets 6–11 contain the point codes. Thus the point code 235-81-8198 is the point code which would be read in FIG. 3. This is backwards as it comes from the message which arrives number, cluster, network ID in the order of bits received. That constitutes the routing label telling the STP and the nodes where the message came from and where it is going. Other parameters are involved depending upon the kind of message. If this were a FISU, that would be it. There would be 16 other bits that have Cyclic Redundancy Codes (CRCs) in them and another flag which would constitute the end. CRCs constitute a further error detection code which is a legal 1 function in the protocol. From the foregoing it will be seen that the messages contain various fields.

This describes the basic format of an SS7 message which is the same for all messages. FIGS. 5 and 6 provide an illustrative breakdown of an IAM. FIG. 5 indicates the various fields that may exist, such as nature of connection, forward indicators, calling party category, etc. Following this are variable parameters such as pointers to another part of the message where other data is located.

Figure 1:
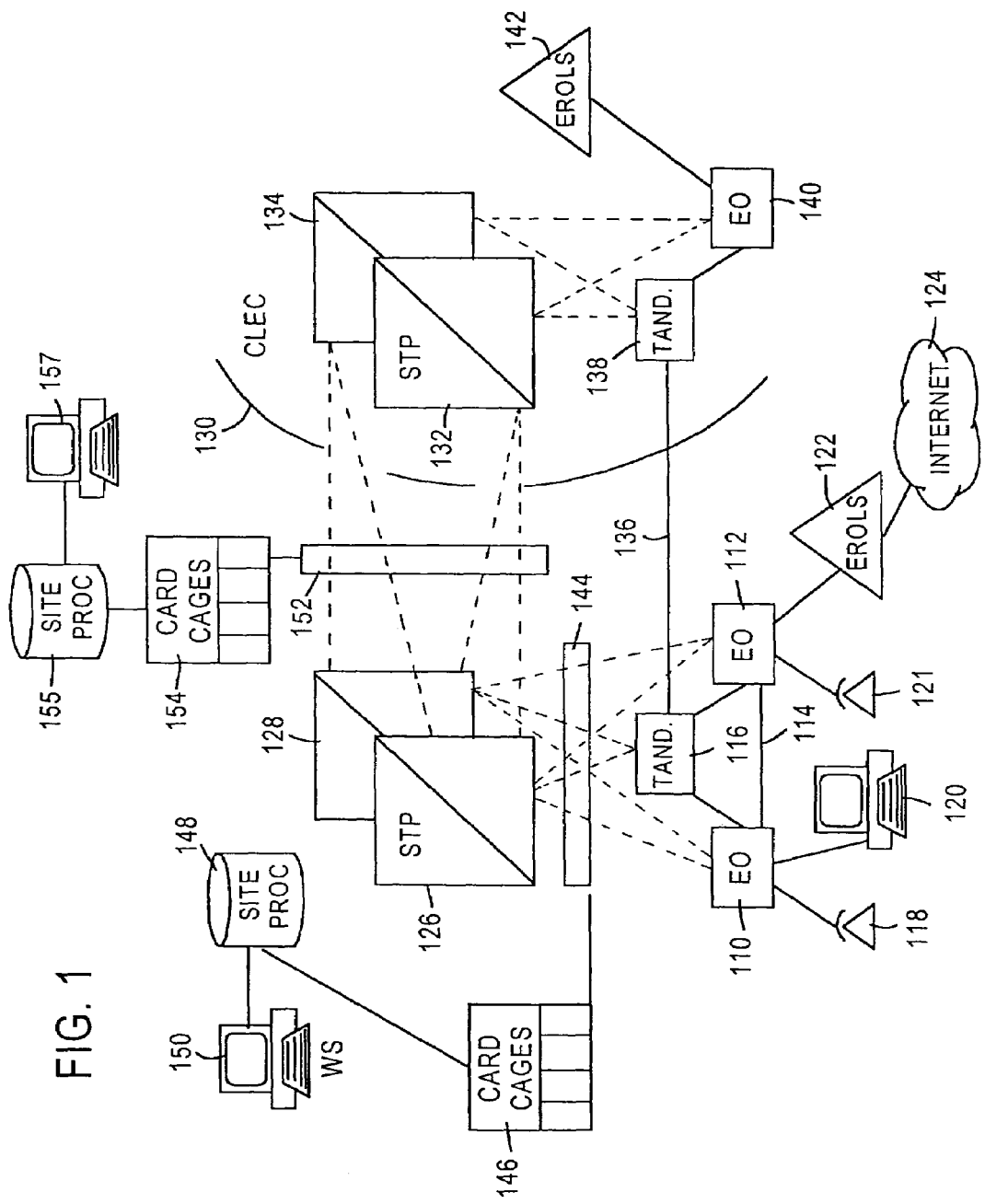
FIG. 1 is a diagrammatic illustration of a public switched telephone network showing its relation to an SS7 common channel interoffice signaling network, a competitor or certified local exchange carrier (CLEC), an Internet Service Provider (ISP), and the Internet.

Referring to FIG. 1 there is shown a diagrammatic illustration of a typical public switched telephone network (PSTN) having an SS7 common channel interoffice switching system fitted with one embodiment of a system for carrying one feature of the invention. FIG. 1 shows a Certified Local Exchange Carrier (sometimes referred to as a competitor local exchange carrier) connected to the main PSTN. Referring to that figure there are seen typical end office switching systems 110 and 112 connected by a direct trunk 114. The central office switches 110 and 112 typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries in an Advanced Intelligent Network (AIN) CCIS system.

In addition to being connected by the illustrative direct trunk(s) 114, the end office switches 110 and 112 are also connected via an illustrative tandem switch 116. The North American telephone network relies on the concept of overflow routing when call demand between end offices exceeds capacity. This extra demand is routed through a specialized switch called a tandem. Tandem switches generally have no subscriber lines, only trunk circuits. These trunks may be from end offices within the local area of the tandem or from other interconnecting networks. Since several end offices (50 or more) may have their overflow trunks connected to the tandem, the tandem acts as a shared spare capacity for all its subtending end offices. A tandem also acts as an access switch where other networks, such as another regional PSTN or a CLEC, will hand off calls to the local carrier. Other than the fact that tandem switches serve only trunks, their construction and operation is similar to the end office switches described above.

The end office switching systems serve subscribers through local loops which typically comprise twisted pair. The end office 110 is illustratively shown serving a telephone terminal 118 and a personal computer (PC) 120, while the end office 112 serves a telephone terminal 121 and an Internet Service Provider (ISP) 122. The ISP is usually connected to the serving office by a multiline hunt group which is optimally of a size adequate to handle the volume of calls to be expected. The ISP is connected to the Internet shown as a cloud 124.

The switching systems in the public switched telephone network are connected by CCIS data links shown as broken lines between paired signal transfer points (STPs) 126 and 128 and the switching systems 110, 112, and 116. In FIG. 1 the PSTN is coupled to a Certified Local Exchange Carrier 130 by SS7 CCIS B and D data links from STPs 126 and 128 to STPs 132 and 134. The two networks are also connected by an illustrative trunk 136 connecting tandem switches 116 and 138. The CLEC STPs 132 and 134 are connected by SS7 A links to the tandem switch 138 and to an illustrative CLEC end office switch 140. The CLEC end office 140 is shown as serving another ISP 142.

According to the invention the public switched telephone network (PSTN) is provided with a traffic monitoring and analyzing system comprising monitors and processors or servers of the type described in detail in the above discussed Pester patent. Referring to FIG. 1, the monitors or interfaces to the SS7 links are shown coupled to the A links between the STPs 126 and 128 and switches 110, 112, and 116 at 144. These monitors or interfaces to the links may be of the type described in the referenced Pester patent. The monitors or interfaces may be conductively or non-conductively coupled to the links to serve as passive interfaces. The monitors are associated with each of the A links to the relevant switches, and are coupled to card cages 146 as shown in the Pester patent.

The card cages 146 are connected to a site processor and storage 148–150, the processor 150 is accessed and controllable by that computer station. In the system described in the Pester patent such a system is utilized to perform surveillance and control of the signaling network to prevent system failures, and to perform other functions such as fraud detection. Such a system is shown in a fraud detection and event control configuration in copending, allowed Chacainias, McDermott and Farris application Ser. No. 08/510,931, titled Common Channel Signaling Event Detection and Control. That application is incorporated herein by reference in its entirety. However, the system shown in FIG. 1 serves a different purpose as will be described in detail. It is intended that multiple systems of this type serving different purposes may advantageously exist in the PSTN, although only a single system is here illustrated for purposes of simplicity and clarity.

The SS7 A link signaling in a completed call typically includes an Initial Address Message (IAM), an Answer Complete Message (ACM), an Answer Message (ANM), Release Message (REL), a Release Complete Message (RLC), and the various other elements described hereinabove. Since the CCIS system is intentionally redundant, the messages in a related set may be routed over different A links. It is therefore necessary to reassemble the signaling pertaining to a desired transaction or signaling set, such as a single call to provide one call detail record or CDR. This is accomplished in the site processor 148 in a known manner as described in the Pester or Brockman et al Patents.

With the reassembled message sets the site processor has the data to show the called and calling stations, the time of the call, the elapsed time of the call, and various other detailed data. By monitoring the SS7 signaling for all of the calls terminating in a designated switch, such as the switch 112, and knowing the number for the ISP, it is possible to gather all of the desired information about calls going to the ISP 122 via an interswitch path. It will be understood that calls completed through a single switch, such as a call from telephone terminal 121 through end office switch 112 to ISP 122, will not generate this type of CCIS signaling and thus will not be reflected in the above discussed SS7 signaling. The assemblage of the data desired for a particular purpose occurs at the site processor level and is under control of the computer station 150.

Figure 7:
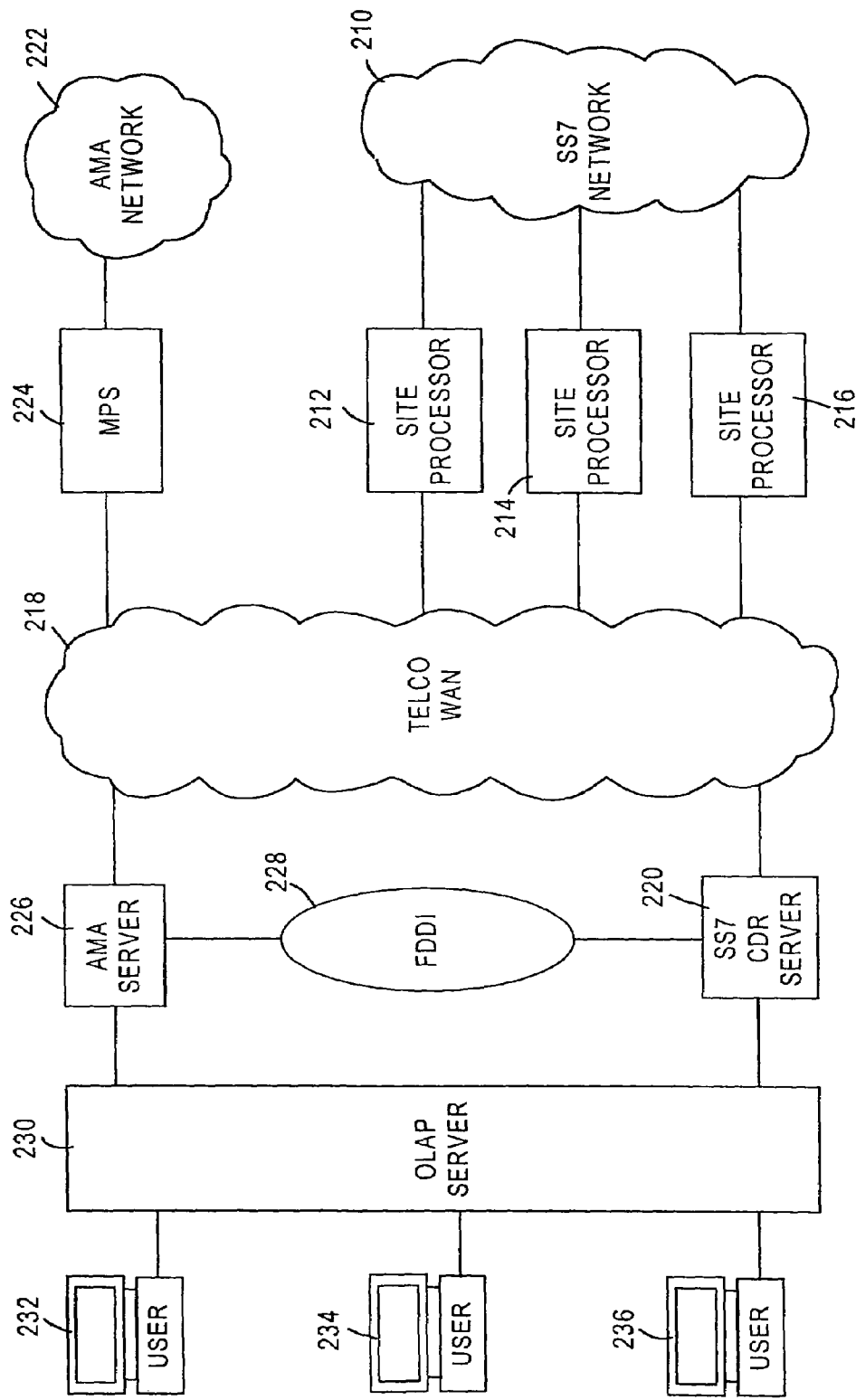
FIG. 7 is a diagrammatic illustration of the network system of FIG. 1 enhanced in a manner to implement unique and novel features of the present invention.

Referring to FIG. 7 the site processors for the SS7 network 210 are shown at 212, 214, and 216. These site processors represent site processors of the type shown at 148 in FIG. 1 and serve in the same capacity. The flat files produced by these processors are delivered to the Telco WAN (wide area network) and from the WAN to a central SS7 CDR flat file server. The server 220 provides a relational database for the collected SS7 flat files. Its primary function is to collect and store call records/CDRs sent from the site servers. It preferably should be configured to tabulate and process defined traffic measurement and user reports in HTML format accessible from a Web Browser interface.

As was pointed out hereinabove, the site processors are capable of assembling and processing information with respect to inter-switch calls but do not handle intra-switch calls. In order that all traffic may be monitored and analyzed it is a feature of one embodiment of the invention to utilize Automated Message Accounting (AMA) data. As will be understood by those skilled in the art, AMA equipment records call details at each stage of a connection. The calling and called party numbers are registered initially. An answer entry registers the time of connection, and the terminating entry registers the time of disconnect. These entries are linked by a common identifying number to distinguish them from other calls on the storage medium. This data is processed at message processing servers (MPS) where the entries are assembled into completed messages and incomplete messages are analyzed for administrative purposes and fraud detection. The AMA equipment also registers local measured service billing details which may be sent to a Revenue Accounting Office (RAO). AMA is here used to refer to the network functionality that measures collects, formats, and outputs subscriber network usage data to upstream billing operating systems and other operating systems (OS). The AMA network is shown in FIG. 7, at 222 and an MPS is shown at 224. The MPS delivers the processed AMA call data to the Telco WAN 218. The Telco WAN delivers the data to a central AMA server 226 where relational databases are maintained. The servers 226 and 220 are linked by a fiber distributed data interface (FDDI) 228, which enables free exchange of information and processing between the two servers.

According to a preferred embodiment of the invention the servers 220 and 226 and their relational databases are connected to a processor or server and OLAP database 230. As will be understood by those skilled in the art, an OLAP processor and database is an OnLine Analytical Processing Database designed for fast access to summarized data. Using specialized indexing techniques, it processes queries that pertain to large amounts of data and multidimensional views of data much faster than traditional relational databases. Among other things it provides an Executive Information System (EIS) that consolidates and summarizes ongoing transactions within a system to provide a data warehouse.

One fact table is surrounded by a series of related tables which the processor is capable of "drilling into" to obtain additional information. Software providing this capability is available from Gentia Software, Inc. of Wakefield, Mass.

under the product name of Gentia DB. Gentia DB is a fully OLAP-compliant multidimensional database. Similar to Essbase, it is loaded with data derived from various company data sources, and is preconsolidated. Gentia supports an "unlimited" number of dimensions, as well as multiple hierarchies within a dimension. It is a fully object oriented visual development environment, with a library of pre-defined objects, and provides an OLAP database with tools for loading, analysis, querying, and reporting.

Gentia runs on multiple platforms and is scalable across a large system. While the program has been described as running on the stand alone processor 230 in FIG. 7, it could be run on either or both of the servers 226 and 220, which communicate through the FDDI 228. The server 230 is accessed by multiple user work stations 232, 234 and 236. It is capable of serving as an interface to the Internet and, in the illustrated example, interfaces to the Telco intranet or WAN 218. The server 230 also interfaces to the switches in the PSTN via a data circuit 238 and is capable of drilling down into switch stored data. For example, the OLAP server 230 is capable of retrieving switch stored data, such as office equipment (OE) numbers. Access to the OLAP processor and database is available from the Telco intranet.

For a study of the calls to the ISP 122, the card cages are set up to monitor all of the A links into the end office switch 112, which is the switch that serves the ISP. Initially all of the relevant SS7 messages off of those links which are directed to the number for that ISP are trapped at the site processor 148. This includes all of those messages including busy and no answer in addition to the messages pertaining to completed calls. Since those messages contain a large quantity of information it is possible to derive quite detailed analysis data.

Preferably the collected call records will contain the following information:
a.) Whether the call is terminating or originating
b.) The total carrier elapsed time (time between IAM and REL)
c.) The total customer elapsed time (time between ANS and REL)
d.) Whether the call was answered and how it was cleared (i.e., busy, normal clearing, etc.)
e.) The date and time the call began
f.) The originating and terminating number This data is then preferably aggregated into periodic reports. Once each period, when the above data is assembled, it is processed and compressed into flat files for each ISP containing the following data:
a.) For every hour from midnight to midnight the number of calls attempted that hour, the average call holding time for calls that began in that hour, and the total MOU for calls that began in that hour. Additionally, the average CCS/MS will be calculated for the 24 hour period and the percent of total terminating MOU destined for the particular ISP in the 24 hour period. The CCS/MS is hundred calls seconds per main station. This is a standard measure of usage for a main station in an hour, with a range from 0 (no measured use in an hour) to 36 (line in use for full 60 minutes). The average CCS/MS represents the sum total of all the calls and their lengths of time that collectively make up usage during the busy hour, divided by the applicable number of working main stations.
b.) Each NPA NXX XXXX that called the ISP during the day. For each line number the report will indicate the total customer connect time for the day for that customer and the average call holding time (number of calls divided by total MOU). The report will only include the 100 highest users.

A summary report will also be generated for the day identifying:
a.) The percent of the total MOU for the switch that was destined for all ISPs
b.) The percent (by MOU) of traffic destined to ISPs by originating offices.

A third report will identify the following statistics for a maximum of 300 randomly selected numbers:
a.) The average call holding time for each number
b.) The total MOU for the 24 hour period for each number
c.) The average CCS/MS for each number The foregoing reports will be generated each 24 hour period and written to a disk file in text form. A second report will be generated writing all data to a file in a comma separated list that is suitable for importing into most spread sheets. Additionally, the data will be written in html format file for display using any Wed Browser. The latter interface will require http Web Server software at the remote site as well as access to the corporate network.

Thus the site processor collects a large amount of raw data from which it assembles call detail records (CDRs), and then extracts that data which is desired for the particular analysis to be made.

In this example all of the calls bound for switch 112 are captured, the call records are assembled into call detail records (CDRs), and then stored in flat files. The flat files are then sent to the work station 150, and the desired analysis is performed at the work station.

In the foregoing discussion it was assumed that the ISP was pre-identified. While the major point of presence for the larger ISPs (SprintNet, ATT Worldnet, AOL) may have been known, there has been very limited data available to effectively engineer and administer for the traffic load to lesser known ISPs. Further, there is very little understanding of how CLECs and ISPs themselves are redirecting huge volumes of traffic bound for the Internet across PSTN tandem and IOF networks. It is a feature of this invention that a method of locating and identifying such ISPs is provided.

A preferred methodology for implementing ISP identification and location may be accomplished in the following manner.

1. Designate an end office switching system that is known to be encountering some congestion.
2. Program the monitoring and analysis system illustrated in FIG. 1 to collect CDR data for that switch during designated hours known to be peak traffic hours. In the system illustrated in FIG. 1 the end office 112 may be selected.
3. Trap all calls bound for office 112 during the designated hours.
4. Assemble the CDRs from the collected data and process and compress that data to form CSV (comma separated values) flat files.
5. Store these flat files in the site processor storage 148.
6. Convert these files to a full featured spread sheet which can link multiple spread sheets for consolidation, such as Excel.
7. Perform a statistical analysis and determine which numbers had the most calls made to them, which calls had the most minutes of use, and which calls had the longest hold times.
8. Call the numbers thus identified and ascertain which are answered by modems. These represent ISPs.

9. Identify the numbers of the parties which called those numbers in the analysis. These are users of the respective ISPs. The information is available from the CDRs.

10. Identify the locations of the users and associated end office switches from Telco records.

The information obtained from this analysis will provide an indication of the routes experiencing difficulties and enable strategic planning to eliminate or at least ameliorate the difficulty. For example, attempts may be made to have distressed users install ADSL or XDSL equipment. Alternatively or conjunctively a Telco data link, such as X.25 or other equivalent, may be established between the end office established as handling the bulk of the overload calls to the ISP.

Turning attention to the CLEC, telecommunication carriers are entering PSTN markets and buying unbundling network services at an accelerated rate. Frequent and detailed measurement of this new traffic is highly desired from the PSTN standpoint to optimize local switch and IOF/tandem design and to effectively plan and implement PSTN off-load strategies. In the case of analyzing the traffic to the CLEC 130 the monitoring takes place on the C and D links between the STP pairs 126 and 128 on the one hand, and 132 and 134 on the other. In each case the monitoring and analysis is completely transparent to the trunk circuits and the customers. However the traffic which is being investigated and monitored is the traffic on the trunks where the overload is likely to occur. That is, while the signaling traffic is being monitored it is not the signaling traffic itself that is a matter of concern. On the other hand it has been found that it is possible through appropriate analysis of the signaling traffic data to determine not only that a call did not complete but also the point at which it failed, i.e., the point of congestion. The release code shows that the release was due to network congestion. In the case of a CLEC every call made is interoffice so that one hundred percent of PSTN/CLEC. calls may be monitored using the SS7 signaling.

The foregoing monitoring and analysis of the CLEC traffic may be implemented by monitors on the B and D links. Such monitors are shown in FIG. 1 at 152 connected to card cages 154. The card cages in turn are connected to the site processor and storage 155 and 157.

FIG. 1 illustrates the installation of that portion of the system of the invention which is local to the pair of STPs 126 and 128. The site processor is typically housed with an STP. This site system is preferably dedicated to the traffic control purposes of this invention. That is, the monitors, card cages, and site processor are not common to any similar equipment which might be used by the PSTN signaling or network surveillance, fraud detection, event detection, or similar purposes. Control of local installations which are distributed about the PSTN network, such as the installation shown in FIG. 1, is centralized according to the preferred embodiment of the invention, and provides enhancements and additional functions to those that are capable of being implemented by the local installation(s).

In summary, the system shown in FIG. 7 will collect, integrate and compress call record data continuously from across the PSTN switching network. Data from two primary sources, namely, SS7 messaging and AMA billing records, will be processed real time off of various regional platforms and routed to a central server where the call records will be stored in a transactional relational database. Through a networked analytical software application running on the database, users of the system will be able to create detailed interactive reports, or perform "on the fly" analysis. The system will be configured in a client-server architecture, with a limited user group. However, the system is so designed as to be readily scaleable by users and data volume, expandable to Web Browser interface, and readily integrated with other PSTN databases and platforms.

Needs that will be satisfied by this system include the following:

a.) End Office Load Balance Process Support—The system will provide an expedient, flexible, accurate, and cost effective method to identify individual high usage lines contributing to blockage. The information will eliminate the need to perform costly, untimely SLU studies and reduce the number of Line Equipment Transfers required to address office load balance concerns.

b.) Tandem/Trunk Planning Resource—Unbundling and the increase in Certified Local Exchange Carriers are increasing the necessity for tandem switch growth. Effective growth must be dependent upon knowing customer calling patterns, communities of interest and points or origin and destination. The new system will provide the tools to adopt a proactive approach that will provide a long term economic solution for serving future demand.

c.) Internet Service Provider (ISP) Studies—ISP traffic analysis performed with the system will provide the PSTN with a means to monitor ISP traffic patterns on a per ISP/switch basis, and enable the PSTN to better serve ISP customers while maintaining optimal network utilization. The system will also provide unique detailed information on the location and calling characteristics on heavy Internet users.

Figure 8:
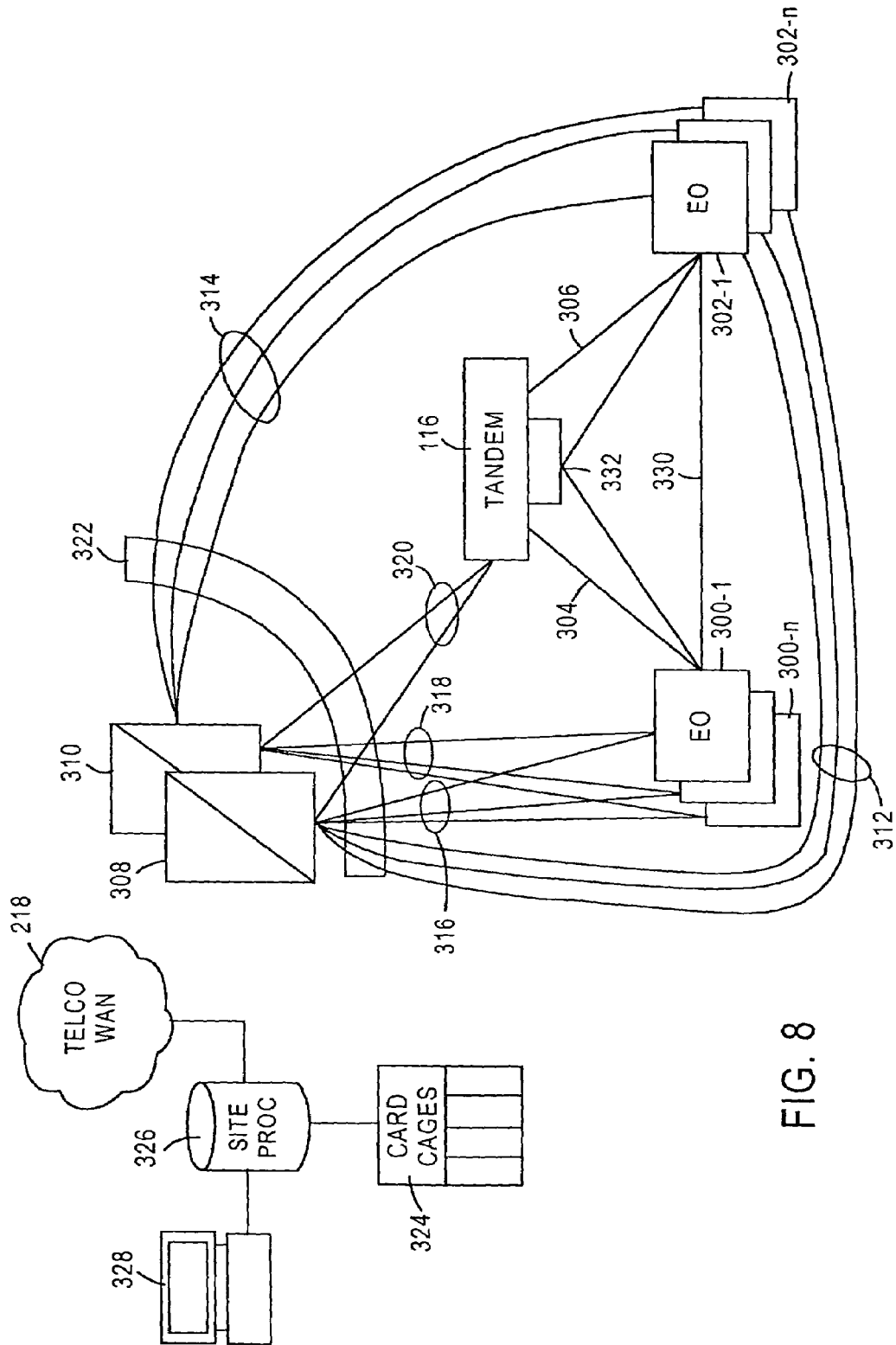
FIG. 8 is a diagrammatic illustration of a network system according to another preferred embodiment of the invention arranged to monitor and analyzed the operation of a tandem switch in relation to its network environment.

Referring to FIG. 8 there is shown an architecture suitable for monitoring and analyzing the performance of a tandem switch, such as the tandem 116 in the PSTN in FIG. 1. All calls that are switched through a tandem produce two records, one for the trunk setup to the tandem, and another for the trunk setup out of the tandem. The first call record, the setup into the tandem, contains the originating point code which identifies the originating switch. It also contains the called party NPA NXX which identifies the terminating switch except in the case where the LEC tandem delivers the call to another tandem. Since the second tandem is not identified by an NPA NXX there is no way to determine the destination of tandem to tandem calls. Fortunately, this condition only happens regularly when a call is sent to, or received from, another carrier which means that end office to end office overflow will be available. This call record also only contains the incoming trunk identifier, the outgoing trunk information is contained in the second part of the call which is not recorded.

Referring to FIG. 8 there is shown a tandem switch 116 which subtends or links a large number of end offices, here shown as offices or switches 300-1 to 300-n and 302-1 to 302-n. These end offices 300-1 to 300-n and 302-1 and 302-n are connected to the tandem 116 by trunk groups illustratively shown by the heavy lines 304 and 306. Each of the switches is connected by A links to an STP pair 308 and 310. The A links are shown at 312, 314, 316, 318, and 320. The A links are provided with monitors shown at 322 connected to card cages 324. The card cages are connected to one or more site processors 326–328. The site processor(s) are connected to the Telco WAN 218 shown in FIG. 7. The end offices 300 and 302 are connected by direct trunk groups shown illustratively by the heavy line at 330.

An illustrative call from end office 300-1 to end office 302-1 may be described as follows: When a subscriber goes off hook in end office 300-1 and dials to call someone served by end office 302-1, the common channel signaling link is first going to determine whether the dialed terminal is available. If so, it will signal to proceed with the call. If all of the direct trunks 330 are busy, It will go back up to the STP and report that condition. The STP will respond by telling the switch 300-1 to set up a connection between itself and the tandem 116, and will tell the tandem to set up a connection between the tandem and end office 302-1. The STP knows all of the paths that it can map, and through its mapping capabilities it is going to know the number of available direct trunks from 300-1 to 302-1, and it is also going to know they are busy. So, once it knows that, then it will conclude that it has to go to an alternate route. In this illustrative case the first choice is to route through the tandem office. It will just tell it to set it up, and it will do that through signaling to the respective offices via A links.

Another reason for traffic studies is to relieve the tandem switch itself, even though the call may be directed through that office. The system of the invention provides a means to analyze not only the load going through the tandem but also to analyze the routing within the tandem facility. There are historically a large number of T-1 systems or DS-1s to and from the tandem each providing 24 routes. Thus, while there may be 24 trunks through the tandem, all of those trunks may not be necessary to handle this call. It may be feasible to loop the call through the tandem facility through a DAX, MUX or multiplexer 332 without going through the switch itself. This will appear as a direct connection. The analysis of the invention will provide the data and high level analysis mechanism to provide concise reports to study this situation.

From a basic standpoint it will take the total number of offices subtending the tandem and rank those offices to show which are making the most use of the tandem. This may involve analysis of three sets of CCIS signaling: the signaling from the originating office to the tandem, the signaling from the tandem to the terminating office, and the original signaling from the original office to the terminating office to determine availability of the dialed terminal. All of this data can be captured from the A link signaling and is subject to the high level analysis in the high level OLAP object oriented transactional processor illustrated at 230 FIG. 7. This provides information to indicate the most economical and efficient solution to the problem. The solution may involve the provision of additional direct trunks, and in such a situation will provide information to indicate the particular end offices which should be linked. Alternately, or conjunctively, this may indicate that more trunk paths are desirable through the tandem. The analysis will also provide direction as to additional analysis and collection of specific data from designated A links to provide an optimum solution.

From the foregoing it may be seen that the system and methodology of the invention provide a powerful and flexible tool for performing varying investigations and surveillance. Thus, as examples, it is feasible to identify ISPs, determine the source of the largest amount of traffic to the identified ISPs, the reason for overloading, the optimal solution to the overloading, analysis of tandem loading and overloading, determination of the largest causes of that overloading, and providing a ranking of potential solutions to discovered problems.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. In a switched telecommunications network having end office switching systems controlled by a common channel signaling system connected to the end office switching systems and to paired signal transfer points, the method comprising:
    monitoring the signaling between the end office switching systems and the signal transfer points and selecting the signaling relating to multiple switched calls and creating a plurality of flat files;
    collating the flat files by transaction;
    processing the collated flat files to create relational files relating to multiple switched calls for multiple called numbers;
    performing an on line analysis program to obtain a multidimensional database from the multiple switched calls to multiple called numbers of said relational files, said on line analysis program supporting interactive analysis for one or more users; and
    generating an on line network voice traffic load report from the multidimensional database based at least in part on said interactive analysis.

2. A method according to claim 1 wherein said multiple switched calls comprise completed dialed telecommunication sessions between a calling terminal and a called terminal.

3. A method according to claim 2 wherein said multiple switched calls also comprise uncompleted dialed attempts to establish telecommunication sessions between a calling terminal and a called terminal.

4. A method according to claim 3 wherein said traffic load report includes calls dialed to a designated terminal in a designated time period.

5. A method according to claim 4 wherein said report includes data relating to the time of connection of completed calls.

6. A method according to claim 5 wherein said report includes data relating to the number of uncompleted calls within a time frame.

7. A method according to claim 2 wherein said multiple switched calls comprise completed dialed telecommunication sessions between a calling terminal and a called terminal, and said report includes calls dialed to a designated terminal in a designated time period and data regarding the lengths thereof.

8. A method according to claim 7 wherein said multiple switched calls also comprise uncompleted attempts to establish dialed telecommunication sessions between a calling terminal and a called terminal, and said report includes the uncompleted calls dialed to said designated terminal in said designated time period.

9. A method according to claim 7 wherein said report includes information regarding the routing of said calls.

10. A method according to claim 9 wherein said report includes information as to whether said calls were routed through a tandem switching system.

11. A method according to claim 10 wherein said report includes information identifying the originating switching systems, the tandem switching systems, and the terminating switching systems for said calls.

12. A method according to claim 11 wherein said report includes information as to whether said calls were routed through a tandem switching facility without routing through the tandem switching facility.

13. A method according to claim 12 wherein said report includes information as to whether said calls were routed through the switch in said tandem switching installation.

14. A method according to claim 1 wherein said common channel signaling system is an SS7 system and said monitoring occurs on A links in that system.

15. A method according to claim 14 wherein said monitoring occurs on A links to the originating switching systems and to the terminating switching systems.

16. A method according to claim 15 wherein said monitoring also occurs on A links to a tandem switching system connected between said originating and said terminating switching systems.

17. A method according to claim 15 including the step of providing a report of calls dialed to a designated terminal in a designated time period and including identification of the originating switching systems.

18. In a switched telecommunications network having end office switching systems controlled by an SS7 common channel signaling system using packet switching via A, B, C, and D links connected to paired signal transfer points connected to one another by D links and connected by A links to the end office switching systems, the method comprising:
    monitoring the signaling in said A links and selecting the A link signaling relating to call set up;
    collating said selected signaling by call;
    processing said collated signaling to create relational files relating to multiple switched calls for multiple called numbers;
    performing an on line analysis program to obtain a multidimensional database from the multiple switched calls to multiple called numbers of said relational files, said on line analysis program supporting interactive analysis for one or more users; and
    generating an on line network voice traffic load report from the multidimensional database that summarizes ongoing call attempts and completions based at least in part on said interactive analysis.

19. A method according to claim 18 including the step of providing a report of calls dialed to a designated terminal in a designated time period.

20. A method according to claim 19 wherein said report includes data relating to time of connection of completed calls.

21. A method according to claim 20 wherein said report includes data relating to the number of incompleted calls within a time frame.

22. A method according to claim 20 wherein said report includes information regarding the routing of said calls.

23. A method according to claim 22 wherein said report includes information as to whether said calls were routed through a tandem switching system.

24. In a switched telecommunications network having trunked end office and tandem switching systems controlled by an SS7 common channel signaling system using packet switching via A, B, C, and D links connected to paired signal transfer points connected to one another by C links and connected by A links to end office and tandem switching systems, the method comprising:
    monitoring the signaling in said A links and selecting the A link signaling relating to call set up between end office switching systems through a tandem switching system;
    collating said selected signaling by call based at least in part on A link signaling to and from said tandem switching system;
    processing said collated signaling to create relational files relating to multiple calls;
    performing an on line analysis program to obtain a multidimensional database from multiple switched calls of said relational files, said on line analysis program supporting interactive analysis for one or more users; and
    generating an on line network voice traffic load report from the multidimensional database based at least in part on said interactive analysis that summarizes successful and unsuccessful attempts to route calls to multiple called numbers through said tandem switching system.

25. A method according to claim 24 including the steps of providing reports of the identity of the end office switching systems from which calls were routed to said tandem switching system.

26. A method according to claim 25 including the steps of providing reports of the identity of the end office switching systems to which calls were routed from said tandem switching system.

27. A switched telecommunications network having a trunked end office and tandem switching systems controlled by an SS7 common channel signaling system using packet switching via A, B, C and D links connected to paired signal transfer points connected to one another by C links and connected by A links to the end office and tandem switching systems, comprising:
    monitors interfacing to the signaling in said A links and selecting the A link signaling relating to call set up between end office switching systems through a tandem switching system;
    processing means collating said selected signaling by call based at least in part on A link signaling to and from said tandem switching system;
    processing means processing said collated signaling to create relational files relating to multiple switched calls to multiple called numbers;
    on line analytical processing means providing a multidimensional database and supporting interactive analysis for one or more users, wherein said relational files are processed to consolidate and summarize successful and unsuccessful attempts to route calls to multiple called numbers through said tandem switching system and provide voice traffic load reports thereof.

28. A switched telecommunications network according to claim 27 wherein said online analytical processing means provides a data warehouse including multiple related tables which said on line analytical processor drills into to retrieve additional information.

29. A switched telecommunications network according to claim 28 wherein said on line analytical processor is object oriented.

30. A switched telecommunications network according to claim 28 wherein at least part of said information is obtained from switching systems in said switched telecommunications network.

31. A switched telecommunications network according to claim 28 wherein at least part of said information is obtained from an automated message accounting system in said switched telecommunications network.

32. A switched telecommunications network according to claim 28 wherein at least part of said information relates to calls completed through intra switching system connections.

33. In a switched telecommunications network having end office switching systems controlled by a common channel signaling system connected to the end office switching systems and to paired signal transfer points, and including automatic message accounting equipment recording call details of a connection transaction, the method comprising:
monitoring the common channel signaling between the end office switching systems and the signal transfer points and selecting the signaling relating to multiple switched calls;
collating the selected common channel signaling by a call of the multiple switched calls;
collating automatic message accounting equipment output recording call detail; and
processing the collated common channel signaling and automatic message accounting output to provide a multidimensional database to consolidate and summarize ongoing multiple switched calls and provide voice traffic load reports thereof;
wherein said last named processing is performed at least in part by on line analytical processing means providing a multidimensional database, wherein relational data is processed to consolidate and summarize successful and unsuccessful attempts to route calls to completion.

34. A method according to claim 33 wherein said on line analytical processing means extracts data from storages in said switched telecommunications network in addition to said common channel signaling and said automatic message accounting equipment to provide said reports.

35. A method according to claim 34 wherein said storages at least in part comprise storage associated with end office switching systems.

36. A method according to claim 35 wherein said extracted data relates to equipment associated with the switching system.

37. A switched telecommunications network having trunked end office and tandem switching systems controlled an SS7 common channel signaling system using packet switching via A, B, C, and D links connected to paired signal transfer points connected to one another by C links and connected by A links to the end office and tandem switching systems, said network including:
monitors interfacing to the signaling in said A links and selecting the A link signaling relating to call set up between end office switching systems;
processing means collating said selected signaling by call based at least in part on A link signaling to and from said end office switching systems;
processing means processing said collated signaling to create relational files relating to multiple switched calls to multiple called numbers;
automatic message accounting equipment recording call details of call set up and tear down;
on line analytical processing means supporting interactive analysis for one or more users and providing a multidimensional database, including information relating to said call set up and tear down obtained from said relational files; and
a program for processing said multidimensional database to consolidate and summarize successful and unsuccessful attempts to route calls to multiple called numbers through said tandem switching system and to provide voice traffic load reports thereof based at least in part on said interactive analysis.

38. A voice-switching telecommunications network having service switching points controlled by a common channel signaling system connected to the service switching points and to paired signal transfer points that maintain normal operation of the voice-switching telecommunications network, the method comprising:
monitoring signaling between the service switching points and the signal transfer points and selecting the signaling relating to multiple interoffice calls over a period of time and creating a plurality of flat files;
collating the flat files by transaction;
processing the collated flat files to create relational files relating to the multiple interoffice calls for multiple called numbers;
performing an on line analysis program to obtain a multidimensional database from the multiple interoffice calls to multiple called numbers of said relational files, said on line analysis program supporting interactive analysis for one or more users; and
generating an on line network voice traffic load report from the multidimensional database based at least in part on said interactive analysis.

39. The method according to claim 38, wherein the service switching points are central office switches, tandem switches, or end office switches, method.

40. The method according to claim 38, wherein the monitoring step includes monitoring for congestion in a trunking network as a result of unbalanced loading between the service switching points in the voice-switching telecommunications network.

41. The method according to claim 38, wherein the monitoring step includes monitoring for congestion in a trunking network as a result of routing utilization between the service switching points in the voice-switching telecommunications network.

42. The method according to claim 38, wherein the period of time relating to the monitoring signaling between the service switching points and the signal transfer points and selecting the signaling relating to multiple interoffice calls is greater than twenty-four hours.

43. The method according to claim 1, wherein the monitoring step includes monitoring for congestion in a trunking network as a result of unbalanced loading between the service switching points in the voice-switching telecommunications network.

44. The method according to claim 1, wherein the monitoring step includes monitoring for congestion in a trunking network as a result of routing utilization between the service switching points in the voice-switching telecommunications network.

45. The method according to claim 18, wherein the monitoring step includes monitoring for congestion in a trunking network as a result of unbalanced loading between the service switching points in the voice-switching telecommunications network.

46. The method according to claim 18, wherein the monitoring step includes monitoring for congestion in a trunking network as a result of routing utilization between the service switching points in the voice-switching telecommunications network.

47. The method according to claim 24, wherein the monitoring step includes monitoring for congestion in a trunking network as a result of unbalanced loading between the service switching points in the voice-switching telecommunications network.

48. The method according to claim 24, wherein the monitoring step includes monitoring for congestion in a trunking network as a result of routing utilization between the service switching points in the voice-switching telecommunications network.

49. The method according to claim 27, wherein the monitoring step includes monitoring for congestion in a trunking network as a result of unbalanced loading between the service switching points in the voice-switching telecommunications network.

50. The method according to claim 27, wherein the monitoring step includes monitoring for congestion in a trunking network as a result of routing utilization between the service switching points in the voice-switching telecommunications network.

51. The method according to claim 33, wherein the monitoring step includes monitoring for congestion in a trunking network as a result of unbalanced loading between the service switching points in the voice-switching telecommunications network.

52. The method according to claim 33, wherein the monitoring step includes monitoring for congestion in a trunking network as a result of routing utilization between the service switching points in the voice-switching telecommunications network.

53. The method according to claim 37, wherein the monitoring step includes monitoring for congestion in a trunking network as a result of unbalanced loading between the service switching points in the voice-switching telecommunications network.

54. The method according to claim 37, wherein the monitoring step includes monitoring for congestion in a trunking network as a result of routing utilization between the service switching points in the voice-switching telecommunications network.

* * * * *